United States Patent Office 3,351,529
Patented Nov. 7, 1967

3,351,529
SYDNONIMINE PHARMACEUTICAL
COMPOSITIONS
Hans Ulrich Daeniker, Reinach, Basel-Land, Switzerland, assignor to Ciba Corporation, New York, N.Y., a corporation of Delaware
No Drawing. Filed Feb. 17, 1965, Ser. No. 433,458
Claims priority, application Switzerland, June 13, 1961, 6,898/61; Sept. 22, 1961, 11,070/61; Apr. 13, 1962, 4,598/62, 4,600/62
9 Claims. (Cl. 167—65)

ABSTRACT OF THE DISCLOSURE

The present invention concerns pharmaceutical compositions comprising as active ingredient a sydnonimine of the formula

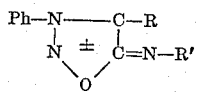

in which Ph represents a phenyl radical which is unsubstituted or mono- or poly-substituted (for example, mono-, di or trisubstituted) by lower alkyl radicals, hydroxyl groups, lower alkoxy groups, methylenedioxy groups, lower alkanoyloxy groups, benzoyloxy groups, halogen atoms and/or trifluoromethyl groups, R stands for a hydrogen atom, a lower alkyl group, a halogen atom or a phenyl group which is unsubstituted or mono- or poly-substituted by lower alkyl radicals, hydroxyl groups, lower alkoxy groups, methylene dioxy groups, halogen atoms and/or trifluoromethyl groups or a lower alkylene group, such as an ethylene or propylene group, attached to the phenyl radical Ph, and R' stands for a hydrogen atom, an alkanoyl group containing up to 20 carbon atoms, a benzoyl group, or a lower alkylcarbamyl group, or a salt thereof. The compositions are useful as antirheumatics.

---

This is a continuation-in-part of my copending application Serial No. 198,706, filed May 31, 1962 and of my copending application Serial No. 198,741, filed May 31, 1962, both of which are now abandoned.

The present invention relates to sydnonimines and pharmaceutical compositions containing them.

More especially the present invention concerns pharmaceutical compositions comprising as active ingredient a sydnonimine of the formula

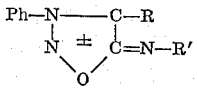

in which Ph represents a phenyl radical which is unsubstituted or mono-or poly-substituted (for example mono-, di- or trisubstituted) by lower alkyl radicals, hydroxyl groups, lower alkoxy groups, methylenedioxy groups, lower alkanoyloxy groups, benzoyloxy groups, halogen atoms and/or trifluoromethyl groups, R stands for a hydrogen atom, a lower alkyl group, a halogen atom or a phenyl group which is unsubstituted or mono-or poly-substituted by lower alkyl radicals, hydroxyl groups, lower alkoxy groups, methylenedioxy groups, halogen atoms and/or trifluoromethyl groups or a lower alkylene group, such as an ethylene or propylene group, attached to the phenyl radical Ph, and R' stands for a hydrogen atom, an alkanoyl group containing up to 20 carbon atoms, a benzoyl group, or a lower-alkylcarbamyl group, or a salt thereof.

Lower alkyl groups are, for example, methyl, ethyl, propyl, isopropyl, branched or unbranched butyl, pentyl or hexyl groups which may be bound in any desired position. As lower alkoxy groups there come into consideration especially methoxy, ethoxy, propoxy or butoxy groups, and as halogen atoms chlorine or bromine.

The alkanoyl radical containing up to 20 carbon atoms is, for example, the radical of pivalic acid, propionic acid, acetic acid, butyric acid, valeric acid, caproic acid, capric acid, lauric acid, palmitic acid or stearic acid.

A lower alkanoyloxy group is above all an acetoxy, propionyloxy, butyryloxy, valeryloxy or caproyloxy group.

The active ingredients of the above pharmaceutical compositions possess good antiphlogistic properties. The compositions can therefore be used as medicaments, for example, as antirheumatics.

The invention also involves treating a subject for reducing inflammation with a composition which comprises one or more of the sydnonimines and their salts mentioned herein as active ingredients; for example, the composition may be administered to rats or dogs.

Special mention deserve the compositions comprising compounds of the formula

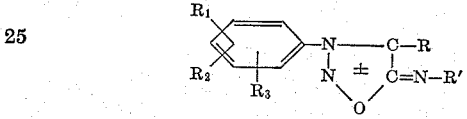

which $R_1$, $R_2$ and $R_3$ each stands for a hydrogen atom or a lower alkyl radical, R has the meaning given above, and R' represents a hydrogen atom, an alkanoyl group containing up to 20 carbon atoms, especially a lower alkanoyl group, or a benzoyl group, and their salts.

Especially valuable are pharmaceutical compositions containing as active ingredient a compound of the formula

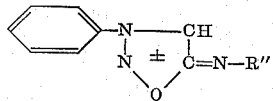

in which R" stands for lower alkanoyl, or a salt thereof and above all the N-acetyl-3-phenyl-sydnonimine, the N-propionyl-3-phenyl-sydnonimine or the N-n-butyl-3-phenyl-sydnonimine or a salt thereof.

A further group of especially valuable active ingredients are the compounds of the formula

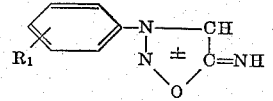

in which $R_1$ stands for lower alkyl, especially methyl, and their salts and above all the salts of 3-(para-tolyl)-sydnonimine and 3-(ortho-tolyl)-sydnonimine.

The sydnonimines mentioned above are obtained according to known methods.

Thus, they can be prepared by treating an N-nitroso-amino-acetonitrile of the formula

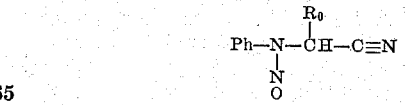

in which Ph has the meaning given above and $R_0$ represents a hydrogen atom, a lower alkyl group or phenyl radical which is unsubstituted or substituted as shown above, or an alkylene radical attached to the phenyl radical Ph, with an acid and, if desired, subjecting the resulting compound in known manner to alkanoylation, benzoylation or lower alkylcarbamoylation and/or halogenation.

Suitable acid agents are inorganic or organic acids, for example the acids mentioned below. Preferred use is made of a hydrohalic acid, such as hydrochloric acid.

The reaction is performed in known manner, in the presence or absence of a diluent and/or solvent such as water, an alcohol, for example methanol, or an ether such as diethyl ether or tetrahydrofuran, at room temperature or below or above it, under atmospheric or superatmospheric pressure.

The alkylanoylation or benzoylation of the N-unsubstituted sydnonimines is carried out in known manner, for example by reaction with an alkanoic or benzoic acid halide or anhydride. Acid halides are especially acid chlorides. The lower alkylcarbamoylation is carried out in the usual manner by reacting the N-unsubstituted sydnonimine with a lower alkyl isocyanate. The reaction is preferably performed in the presence of an acid-acceptor such as an organic or inorganic base, for example pyridine or an alkali metal carbonate or acetate, and in the presence of a solvent and/or diluent, at room temperature or below or above it, under atmospheric or superatmospheric pressure.

The halogenation is carried out by treatment with a halogenating agent such, for example, as elemental chlorine or bromine, or with an agent giving off chlorine or bromine.

The reaction is performed in the presence or absence of a diluent and/or solvent and/or condensing agent, in the case of the halogenation of an N-acyl-sydnonimine for example in the presence of a basic agent, such as an organic or inorganic base, for example pyridine or an alkali metal carbonate, at room temperature or below or above it, under atmospheric or superatmospheric pressure.

Taking into consideration the instability of the N-unsubstituted sydnonimines in the form of their free bases, it is of advantage to react them in the form of their salts and under conditions such that the free base is formed only when necessary and even in this case only immediately before proceeding to the reaction. Thus for example, in a resulting compound which contains an acyloxyphenyl radical, the acyl radical is split off by hydrolysis, for example in the presence of a base, for example a hydroxide or a carbonate of an alkali metal, such as sodium or potassium.

Depending on the reaction conditions used the new compounds are obtained in the form of the free bases or of their salts. In the form of the free base the sydnonimines unsubstituted at the imino group are relatively instable; accordingly, they are advantageously produced and used in the form of their salts. The N-acylated sydnonimines are stable both as free bases and as salts.

That the N-acyl derivatives of the sydnonimines form salts is surprising and was not foreseeable. The salts have certain advantages as compared with the corresponding free bases. For example, they are particularly more readily soluble in water and, consequently, easier to administer and have a greater stability than the free bases; for example, they are less sensitive to the effects of light and heat. The salts of N-acyl-sydnonimines described above therefore form a special object of the invention.

From the salts the free bases can be obtained in known manner. From the latter salts can be prepared by reaction with organic or inorganic acids. As salt-forming acids there may be mentioned more especially those which are suitable for the formation of pharmaceutically useful salts, for example: hydrohalic acids, sulfuric, phosphoric, nitric and perchloric acid; aliphatic, alicyclic, aromatic or heterocyclic carboxylic or sulfonic acids such as formic, acetic, propionic, oxalic, succinic, glycollic, lactic, malic, tartaric, citric, ascorbic, maleic, hydroxymaleic, dihydroxymaleic, or pyruvic acid; phenylacetic, benzoic, para-aminobenzoic, anthranilic, para-hydroxybenzoic, salicylic or para-aminosalicylic acids; methanesulfonic, ethanesulfonic, hydroxyethanesulfonic, ethylenesulfonic acid; toluenesulfonic or naphthalenesulfonic acids or sulfanilic acid; methionine, tryptophan, lysine or arginine.

The salts of the new compounds may also serve for the purification of the resulting bases by converting the bases into the salts, separating the latter and liberating the bases from the salts.

The starting materials are known or may be prepared by methods known per se.

For the processes mentioned derivatives of the starting materials may be used which are converted into the aforementioned starting materials in the course of the reaction.

The starting materials may be prepared in situ. Thus for example, a corresponding phenylamino-acetonitrile can be treated in an acid solution with a nitrosating agent, such as a nitrous gas, whereupon the corresponding N-nitroso-arylamino-acetonitrile is obtained as an intermediate which is then further reacted to furnish the sydnonimine.

The pharmaceutical compositions contain the active ingredients in admixture or conjunction with a pharmaceutical, organic or inorganic, solid or liquid excipient, suitable for enteral, parenteral or topical administration.

As such substances there come into consideration those which do not react with the active principle, for example water, gelatine, lactose, starch, stearyl alcohol, magnesium stearate, talc, vegetable oils, benzyl alcohols, gums, propylene glycol, polyalkylene glycols, white petroleum jelly, cholesterol or other known medicinal excipient. The pharmaceutical preparations may be, for example, tablets, dragees, ointments, creams or capsules, or in liquid form solutions, suspensions or emulsions. They may be sterilized and/or may contain assistants such as preserving, stabilizing, wetting or emulsifying agents, solution promoters, or salts for regulating the osmotic pressure, or buffers. They may also contain further therapeutically useful substances. The preparations are obtained by the conventional methods. They contain a pharmacologically effective amount, advantageously about 10 to 200 mg., particularly 30 to 100 mg., of the active principle per effective dosage unit.

The amount of excipient used may vary within wide limits and depends substantially on the route of administration.

The daily dose depends on the route of administration and on the individual requirements of the subject concerned.

A further special object of the invention are the sydnonimines of the formula

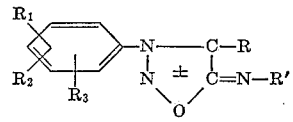

in which $R_1$ stands for a hydroxyl group, a lower alkoxy group, e.g. one of those mentioned above, a lower alkanoyloxy group, e.g. one of those mentioned above, a benzoyloxy group, a halogen atom, for example one of those mentioned above, or the trifluoromethyl group, $R_2$ and $R_3$ each stands for a hydrogen atom, a lower alkyl group, for example one of those mentioned above, a hydroxyl group, a lower alkoxy group, e.g. one of those mentioned above, a lower alkanoyloxy group, e.g. one of those mentioned above, a benzoyloxy group, a halogen atom, for example one of those mentioned above, or the trifluoromethyl group, or, when taken together they stand for the methylenedioxy group, R has the meaning given above and R' represents a hydrogen atom, an alkanoyl group containing up to 20 carbon atoms or a benzoyl group, and their salts, for example those mentioned above. These compounds are new.

Especially valuable are the compounds of the formula

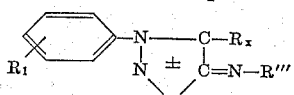

in which $R_1$ has the above meaning $R_x$ stands for hydrogen, lower alkyl, phenyl or p-chlorophenyl and $R'''$ for hydrogen or lower alkanoyl, and their salts. A further valuable group of new compounds and therefore a further object of the invention are the compounds of the formula

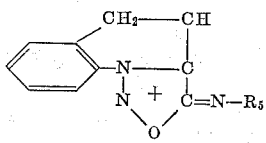

in which $R_5$ represents a hydrogen atom or an alkanoyl group containing up to 20 carbon atoms, especially a lower alkanoyl group, or a benzoyl group, and their salts.

A further object of the invention are the compounds of the formula

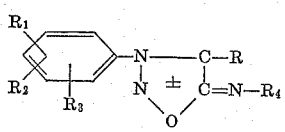

in which $R_1$, $R_2$ and $R_3$ each stands for a hydrogen atom, a lower alkyl group, for example one of those mentioned above, a hydroxyl group, a lower alkoxy group, e.g. one of those mentioned above, a lower alkanoyloxy group, e.g. one of those mentioned above, a benzoyloxy group, a halogen atom, for example one of those mentioned above, or the trifluoromethyl group, or, when two of them are taken together, they stand for the methylenedioxy group, R has the meaning given above, and $R_4$ stands for lower alkylcarbamoyl, and their salts. These compounds are new.

Especially valuable compounds of this group are those of the formula

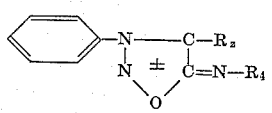

in which $R_4$ has the above meaning and $R_z$ stands for hydrogen, lower alkyl or halogen, and the salts thereof.

It is understood that the groups of new compounds mentioned hereinbefore also represent preferred ingredients of the previously described pharmaceutical compositions.

The following examples illustrate the invention without restricting its scope thereto.

*Example 1*

1 liter of methanolic hydrochloric acid is added to 67.5 grams of N-nitroso-anilino-acetonitrile and the clear solution is evaporated to dryness under vacuum. The crystalline residue is recrystallized from isopropanol, to yield 3-phenylsydnonimine hydrochloride of the formula

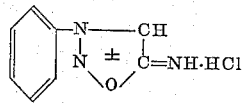

melting at 175° C. with decomposition.

*Example 2*

100 cc. of acetic anhydride and 5 cc. of absolute pyridine are added to 10 grams of 3-phenylsydnonimine hydrochloride and the resulting suspension is heated for 8 hours on a steam bath, then cooled to 0° C., and the crystals are suctioned off and rinsed with ether. On recrystallization from 250 cc. of alcohol there is obtained N-acetyl-3-phenyl-sydnonimine hydrochloride of the formula

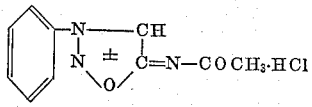

melting at 207–210° C. with decomposition.

To prepare the corresponding free base 2 grams of the hydrochloride are dissolved in 20 cc. of water, and 20 cc. of aqueous sodium bicarbonate solution of 10% strength are added. A strong evolution of gas sets in and colorless crystals separate out which are suctioned off and recrystallized from isopropanol, to yield N-acetyl-3-phenylsydnonimine in the form of colorless flakes melting at 151–153° C. with decomposition.

*Example 3*

19.8 grams of N-nitroso-α-anilino-valeronitrile are mixed with 200 cc. of methanolic hydrochloric acid, the clear solution is kept for 1 hour at room temperature and then evaporated to dryness at 40° C. under vacuum. The residue is dissolved in 200 cc. of water and once more evaporated, whereupon colorless, strongly light-sensitive crystals are obtained. After recrystallization from isopropanol, there is obtained 3-phenyl-4-n-propylsydnonimine hydrochloride in the form of colorless crystals containing 1 molecular proportion of water of crystallization; they sinter strongly at 100° C. and then melt at 148° C. with decomposition. The formula of the anhydro compound is

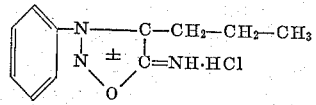

The starting material can be prepared, for example, as follows:

A mixture of 35 grams of aniline and 100 cc. of water is mixed at 0° C. with 10 grams of anhydrous hydrocyanic acid, and 27 grams of n-butyric aldehyde are then stirred in dropwise while cooling. The resulting crystal suspension is stirred for 30 minutes at 0° C., and then overnight at room temperature, then cooled, suction-filtered and thoroughly washed with water on the filter. The crystalline residue is recrystallized from isopropanol, to yield α-anilino-valeronitrile in the form of colorless crystals melting at 51–53° C.

17.4 grams of this substance are dissolved in a mixture of 350 cc. of methanol and 220 cc. of aqueous hydrochloric acid of 0.5 N-strength, and while cooling at 0° C., a solution of 7.0 grams of sodium nitrite in 50 cc. of water is stirred in dropwise. The resulting emulsion is stirred for 2 hours at 5° C. and extracted with ether. The ethereal extract is dried and evaporated under vacuum, to yield crude N-nitroso-α-anilino-valeronitrile as a yellow oil which is used for the preparation of the corresponding sydnonimine as it is, without purification.

In an analogous manner to that described above there may be prepared the 3-(3,4,5-trimethylphenyl)-sydnonimine hydrochloride.

*Example 4*

Within 30 minutes 10 grams of n-caproyl chloride are stirred dropwise at 0° C. into a suspension of 10 grams of 3-phenylsydnonimine hydrochloride in 50 cc. of absolute pyridine, the whole is stirred overnight at 0° C., and 400 cc. of aqueous sodium carbonate solution of 5% strength are then added. The mixture is stirred for 1 hour at 0° C., the separated crystals are suctioned off, washed with water, dried and recrystallized from 300 cc. of ether, to yield N-caproyl-3-phenylsydnonimine is in the form of yellowish needles, melting at 82–84° C., of the formula

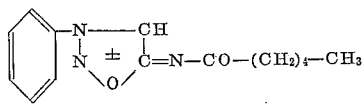

The corresponding hydrochloride melts at 143–154° C. with decomposition after recrystallization from isopropanol.

Example 5

By the process described in Example 4 and employing 10 grams of 3-phenyl-sydnonimine hydrochloride and 10 grams of isobutyric acid chloride in 50 cc. of absolute pyridine there is obtained N-isobutyryl-3-phenylsydnonimine, which is recrystallizable from isopropanol, of the formula

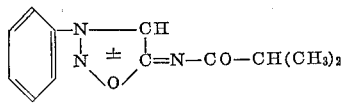

melting at 81 to 83° C. with decomposition.

Example 6

By the process described in Example 4 and employing 10 grams of 3-phenyl-sydnonimine hydrochloride and 20 grams of lauroyl chloride in 50 cc. of absolute pyridine there is obtained N-lauroyl-3-phenyl-sydnonimine, which is recrystallizable from ether+petroleum ether, of the formula

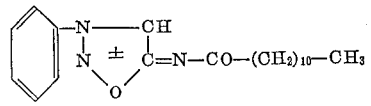

melting at 65 to 67° C.

Example 7

20 grams of 3:4-diphenyl-sydnonimine hydrochloride, 200 cc. of propionic acid anhydride and 200 cc. of absolute pyridine are heated for 6 hours on a steam bath and the solution then evaporated to dryness in vacuo. The crystalline residue is recrystallized from a mixture of isopropanol and ether to yield N-propionyl-3:4-diphenylsydnonimine hydrochloride of the formula

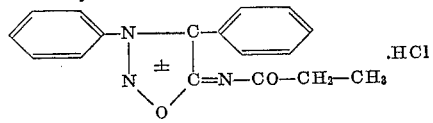

melting at 182–184° C.

In order to prepare the corresponding free base 3.35 grams of the hydrochloride are dissolved in 20 cc. of water, and 20 cc. of aqueous sodium bicarbonate solution of 10% strength are added. A strong evolution of gas sets in and colorless crystals separate out which are suctioned off and recrystallized from isopropyl alcohol, to yield N-propionyl - 3:4 - diphenyl - sydnonimine melting at 133–134° C.

Example 8

A suspension of 20 grams of 3-phenyl-sydnonimine hydrochloride in 100 cc. of n-butyric acid anhydride and 20 cc. of absolute pyridine is stirred at room temperature, a dense crystalline cake forming after 30 minutes with weak spontaneous heating. The reaction mixture is left to itself overnight, then suction filtered and washed out with ether. The resulting crystals are recrystllized from isopropyl alcohol to yield N-butyryl-3-phenylsydnonimine hydrochloride of the formula

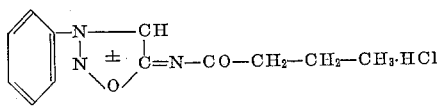

melting at 144–145° C. with decomposition.

The corresponding free base is obtained by dissolving the hydrochloride in water and precipitation by the addition of aqueous sodium bicarbonate solution. After recrystallization from ether the resulting N-butyryl-3-phenyl- sydnonimine melts at 105–107° C. with decomposition.

Example 9

In the same way as described in Example 8 but using n-valeric acid anhydride in the place of n-butyric acid anhydride there is obtained N-valeryl-3-phenyl-sydnonimine hydrochloride of the formula

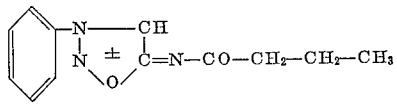

melting at 139–140° C. The corresponding free base melts at 86–88° C.

Example 10

18 grams of 3-phenyl-4-methyl-sydnonimine hydrochloride, 100 cc. of propionic acid anhydride and 20 cc. of absolute pyridine are stirred for 8 hours at room temperature and then allowed to stand overnight at −10° C. The precipitated crystals are suction-filtered, washed with ether and recrystallized from isopropanol to yield N-propionyl - 3-phenyl-4-methyl-sydnonimine hydrochloride of the formula

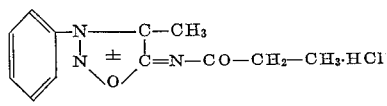

melting at 184–185° C. The corresponding free base melts at 70° C. after recrystallization from ether.

Example 11

37.2 grams of crude 3-phenyl-4-(para-chlorophenyl)-sydnonimine hydrochloride are heated in a mixture of 200 cc. of propionic acid anhydride and 40 cc. of absolute pyridine for 3 hours at 60– 70° C. The reaction mixture is then cooled, the prepicitated crystals suction-filtered, washed with ether and recrystallized from absolute alcohol to yield N-propionyl-3-phenyl-4-(para-chlorophenyl)-sydnonimine hydrochloride of the formula

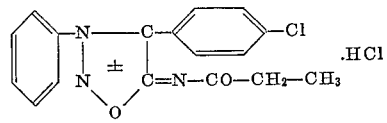

melting at 198–199° C. with decomposition.

The starting material is obtained, for example, as follows: 35 grams of para-chloro-benzaldehyde and 24 grams of aniline are dissolved in 100 cc. of glacial acetic acid, stirred for half an hour at room temperature and then treated with a solution of 17 grams of potassium cyanide in 25 cc. of water. A crystalline precipitate forms rapidly which is suction-filtered after 20 hours and recrystallized from 200 cc. of methanol to yield α-anilino-α-(para-chlorophenyl)-acetonitrile melting at 111 to 113° C.

40.5 grams of the above substance are dissolved in a mixture of 400 cc. of methanol and 30 cc. of concentrated hydrochloric acid and treated dropwise at 0° C. and stirring with a solution of 12 grams of sodium nitrite in 30 cc. of water. The resulting dense suspension is stirred for some time, treated with 500 cc. of water, suction-filtered and dried. The resulting crystals are recrystallized from a mixture of ether and petroleum ether to yield N-nitroso-α-anilino - α - (para-chlorophenyl)-acetonitrile melting at 44–46° C.

30 grams of this compound are dissolved in 250 cc. of saturated methanolic hydrochloric acid. After 15 minutes the clear solution is evaporated to dryness in vacuo to yield crude 3-phenyl-4-(para-chlorophenyl)-sydnonimine hydrochloride in the form of an oil.

Example 12

A solution of 20 grams of 3-phenylsydnonimine hydrochloride in 200 cc. of propionic acid anhydride and 10 cc. of absolute pyridine is heated for 8 hours on a steam bath, and then evaporated to dryness under vacuum at 60–70° C. The crystalline residue is twice recrystallized from isopropanol, to yield N-propionyl-3-phenylsydnonimine hydrochloride of the formula

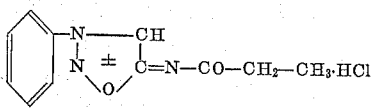

melting at 165–167° C. with decomposition.

By dissolving the above product in water and adding aqueous sodium bicarbonate solution the corresponding free base is obtained which, after recrystallization from ether, melts at 90 to 92° C. with decomposition.

Example 13

1 gram of N-propionyl-3-phenyl-sydnonimine is dissolved in 50 cc. of ether and treated with a solution of 0.6 gram of maleic acid in 15 cc. of ether. A crystalline precipitate forms immediately which, after being cooled to 0° C., is suction-filtered and recrystallized from 20 cc. of isopropanol to yield the maleate of N-propionyl-3-phenyl-sydnonimine as colorless, readily water-soluble crystals melting at 105–106° C.

Example 14

A solution of 28.5 grams of N-nitroso-paratoluidino-acetonitrile in 400 cc. of methanolic hydrochloric acid is kept for 15 minutes at room temperature and then evaporated to dryness under vacuum. The crystalline residue is recrystallized from 200 cc. of absolute alcohol, to yield 3-(para-tolyl)-sydnonimine hydrochloride in the form of colorless crystals melting at 194–195° C. with decomposition, of the formula

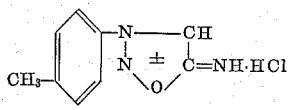

In an analogous manner there are obtained: 3-(ortho-tolyl)-sydnonimine hydrochloride, melting at 147–148° C. with decomposition (from absolute alcohol+ether), and 3-(meta-tolyl)-sydnonimine hydrochloride, melting at 189–191° C. with decomposition (from absolute alcohol).

The starting materials can be prepared, for example, in the following manner:

24.6 grams of para-toluidino-acetonitrile are dissolved in the calculated amount of aqueous-methanolic 0.25 N-hydrochloric acid of 50% strength, a solution of 12.3 grams of sodium nitrite in 50 cc. of water is stirred in at 0° C., and the whole is extracted with ether, to yield N-nitroso-para-toluidino-acetonitrile in the form of an oil which is further used as it is, without purification. In an analogous manner N-nitroso-ortho-toluidino-acetonitrile and N-nitroso-meta-toludino-acetonitrile can be prepared.

Example 15

A mixture of 16 grams of 3-(para-tolyl)-sydnonimine hydrochloride, 50 cc. of pyridine and 200 cc. of acetic anhydride is heated for 1½ hours on a steam bath and then evaporated to dryness under vacuum. The crystalline evaporation residue is recrystallized from 250 cc. of isopropanol, to yield N-acetyl-3-(para-tolyl)-sydnonimine hydrochloride in the form of colorless needles melting at 184–185° C. with decomposition, of the formula

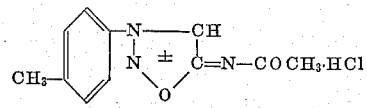

The corresponding free base melts at 153–155° C. with decomposition after having been recrystallized from isopropanol.

In an analogous manner there are obtained: N-acetyl-3-(ortho-tolyl)-sydnonimine hydrochloride, melting at 204–205° C. (from alcohol); its free base melting at 147–148° C. (from isopropanol), and N-acetyl-3-(meta-tolyl)-sydnonimine hydrochloride, melting at 204–205° C. (from isopropanol); its free base melting at 127–130° C. (from isopropanol).

Example 16

53.7 grams of N-nitroso-3:4-dimethyl-anilino-acetonitrile are dissolved in 400 cc. of saturated methanolic hydrochloric acid, the solution allowed to stand for a quarter of an hour at room temperature and then evaporated to dryness in vacuo. The crystalline residue is recrystallized from 250 cc. of isopropanol to yield 3-(3':4'-dimethylphenyl)-sydnonimine hydrochloride of the formula

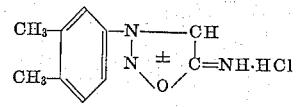

melting at 181–182° C. with decomposition.

The starting materials may be prepared as follows:

48 grams of 3:4-dimethyl-anilino-acetonitrile are dissolved in a mixture of 300 cc. of methanol and 30 cc. of concentrated hydrochloric acid, cooled to 0° C. and a solution of 21 grams of sodium nitrite in 50 cc. of water is added dropwise. After some time 200 cc. of water are added and the precipitated oil extracted with ether. The ether extract is dried and evaporated to dryness to yield N-nitroso-3:4-dimethyl-anilino-acetonitrile as an oil.

Example 17

100 cc. of propionic acid anhydride and 20 cc. of absolute pyridine are added to 22.5 grams of 3-(3':4'-dimethylphenyl)-sydnonimine hydrochloride, and the whole stirred at room temperature. A clear solution forms with weak spontaneous heating which after some time, is evaporated to dryness in vacuo. The crystalline residue is recrystallized from isopropanol to yield N-propionyl-3-(3':4'-dimethylphenyl)-sydnonimine hydrochloride of the formula

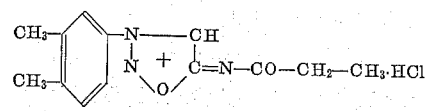

melting at 173–175° C. with decomposition.

Example 18

3.9 grams of N-nitroso-α-(para-toluidino)-propionitrile are dissolved in 70 cc. of saturated methanolic hydrochloric acid, the clear yellow solution is allowed to stand for 20 minutes at room temperature and then evaporated to dryness in vacuo. The colorless crystalline residue is recrystallized from alcohol to yield 3-(para-tolyl)-4-methyl-sydnonimine hydrochloride of the formula

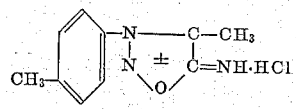

melting at 227–229° C. with decomposition.

The starting material may be obtained, for example, as follows:

54 grams of para-toluidine are added to a solution of 52 grams of sodium bisulfite and 22 grams of acetaldehyde in 200 cc. of water, and the whole is stirred overnight at 30° C. The reaction mixture is then heated to 90° C., a solution of 33 grams of potassium cyanide in 70 cc. of water is added and the whole cooled after 10 minutes to 0° C. The precipitated oil is taken up in ether, dried and fractionated. The fraction passing over at 110°

C. under 0.7 mm. of pressure crystallizes; after recrystallization from ether there is obtained α-(para-toluidino)-propionitrile melting at 78–79° C. 3.5 grams of this substance are dissolved in 25 cc. of methanol. After the addition of 25 cc. of N-hydrochloric acid a crystalline suspension is obtained to which a solution of 2 grams of sodium nitrite in 10 cc. of water is added dropwise at 0° C. with stirring. After stirring for 2 hours at room temperature, the crystals are suction-filtered to yield N-nitroso-α-(para-toluidino)-propionitrile melting at 42–43° C.

*Example 19*

300 cc. of methanolic hydrochloric acid are added to 50 grams of N-nitroso-α-(para-toluidino)-benzyl-cyanide, the whole is allowed to stand for half an hour and then evaporated to dryness in vacuo. The crystalline residue is recrystallized from isopropanol to yield 3-(para-tolyl)-4-phenyl-sydnonimine hydrochloride of the formula

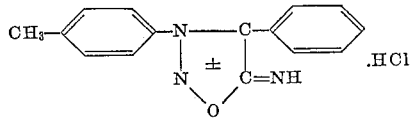

melting at 197–198° C. with decomposition.

The starting material may be obtained, for example, as follows:

In a stirring flask there are mixed 52 grams of sodium bisulfite and 53 grams of benzaldehyde with 200 cc. of water, 54 grams of para-toluidine are added and the resulting suspension stirred for 6 hours at 60° C. The reaction mixture is heated to 90° C., a solution of 35 grams of potassium cyanide in 70 cc. of water is added and the whole cooled after 10 minutes. The precipitated crystals are suction-filtered and recrystallized from methanol to yield α-(para-toluidino)-benzylcyanide melting at 107–108° C.

44.4 grams of the compound are suspended in 200 cc. of methanol and 25 cc. of concentrated hydrochloric acid and treated dropwise with a solution of 15 grams of sodium nitrite in 25 cc. of water at 0° C. with stirring. After stirring for 2 hours at room temperature, 200 cc. of water are added and the precipitated oil taken up in ether. The extract is dried and evaporated to dryness to yield N-nitroso-α-(para-toluidino)-benzyl-cyanide as a clear red oil.

*Example 20*

400 cc. of saturated methanolic hydrochloric acid are added to a solution of 49.5 grams of N-nitroso-α-(para-toluidino)-para-chlorobenzyl-cyanide in 50 cc. of methanol and the resulting solution evaporated to dryness in vacuo. The crystalline residue is recrystallized from a mixture of isopropanol and ether (2:3) to yield 3-(para-tolyl) - 4 - (para-chlorophenyl)-sydnonimine hydrochloride of the formula

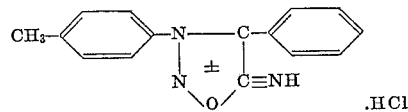

melting at 187–188° C. with decomposition.

The starting material may be prepared, for example, as follows:

A mixture of 35 grams of para-chloro-benzaldehyde and 27 grams of para-toluidine in 100 cc. of glacial acetic acid is stirred for half an hour at 25° C.; a solution of 17 grams of potassium cyanide in 25 cc. of water is added, and the whole stirred overnight at room temperature. The precipitated crystals are suction-filtered, washed with water and recrystallized from 150 cc. of methanol to yield α-(para-toluidino)-para-chlorobenzyl-cyanide melting at 75–80° C. 51.7 grams of this compound are suspended in 500 cc. of methanol and 30 cc. of concentrated hydrochloric acid and treated at 0° C. dropwise with a solution of 15 grams of sodium nitrite in 40 cc. of water with stirring. After stirring for 2 hours at 0° C., 500 cc. of water are added and the precipitated oil taken up in ether. The ether extract is dried and then evaporated to dryness to yield N-nitroso-α-(para-toluidino)-para-chlorobenzyl-cyanide as an oil.

*Example 21*

350 cc. of saturated methanolic hydrochloric acid are added to 47 grams of N-nitroso-α-(para-toluidino)-3:4-dimethoxy-benzyl cyanide; the whole is allowed to stand at room temperature until solution is complete (30 minutes) and is then evaporated to dryness in vacuo. The foam remaining behind crystallizes only on the addition of water. By recrystallization from water there is obtained 3-(para-tolyl)-4-(3':4' - dimethoxyphenyl) - sydnonimine hydrochloride as sesquihydrate of the formula

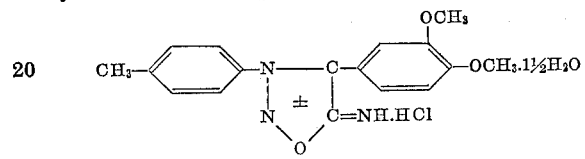

melting at 135–137° C. with decomposition.

The starting material may be obtained, for example, as follows:

A solution of 17 grams of potassium cyanide in 25 cc. of water is added to a solution of 42 grams of veratrum aldehyde and 27 grams of para-toluidine in 100 cc. of glacial acetic acid and the whole stirred overnight at 25° C. The precipitated crystals are suction-filtered, washed with water and recrystallized from 1.4 liters of methanol to yield α-(para-toluidino) - 3:4 - dimethoxybenzyl-cyanide melting at 143–144° C. 55 grams of this compound are mixed with 500 cc. of methanol and 30 cc. of concentrated hydrochloric acid and treated dropwise at 0° C. with a solution of 14 grams of sodium nitrite in 40 cc. of water with stirring. Stirring is continued for 2 hours at 0° C. and for 1 hour at 25° C., and 500 cc. of water are then added. The precipitated crystals are suction-filtered, dried and recrystallized from 1.8 liters of ether. There is obtained N-nitroso-(para-toluidino)-3:4-dimethoxybenzyl cyanide melting at 102–103° C.

*Example 22*

Ampoules containing 3-phenylsydnonimine hydrochloride as active principle can be made in conventional manner from the following ingredients:

3-phenylsydnonimine hydrochloride, mg _____ 40
Sodium chloride to form an isotonic solution.
Water, cc _____ 5

*Example 23*

Capsules containing N-acetyl-3-phenylsydnonimine as active principle are obtained by charging gelatine capsules in known manner with a mixture of the following composition:

|  | Mg. |
|---|---|
| N-acetyl-3-phenylsydnonimine | 100 |
| Magnesium stearate | 5 |
| Talc | 20 |
| Per capsule | 125 |

In an analogous manner capsules can be manufactured that contain as active principle N-acetyl-3:4-diphenyl-sydnonimine, N-benzoyl-3-phenylsydnonimine, N-isobutyryl - 3 - phenylsydnonimine, N-lauroyl-3-phenylsydnonimine, 3 - (para - tolyl) - sydnonimine hydrochloride, 3-(ortho - tolyl) - sydnonimine hydrochloride, N - acetyl-3-(para - tolyl)-sydnonimine, 3-(3':4'-dimethylphenyl)-sydnonimine hydrochloride, 3-(para-tolyl)-4-methyl-sydnonimine hydrochloride, 3-(para-tolyl)-4-phenyl-sydnonimine hydrochloride, 3-(para-tolyl) - 4 - (para-chlorophenyl)- sydnonimine hydrochloride or 3-(para-tolyl)-4-(3':4'-dimethoxyphenyl)-sydnonimine hydrochloride.

Example 24

A tablet containing N-acetyl-3-phenyl-sydnonimine hydrochloride as active principle may be made up, for example, from the following ingredients:

|  | Mg. |
|---|---|
| N-acetyl-3-phenyl-sydnonimine hydrochloride | 100.0 |
| Wheat starch | 136.0 |
| Colloidal silicic acid with hydrolyzed starch | 15.0 |
| Gelatine | 3.0 |
| Arrowroot | 25.0 |
| Stearic acid | 9.0 |
| Talc | 12.0 |
|  | 300.0 |

The tablet may be prepared in the following way:

N-acetyl-3-phenyl-sydnonimine hydrochloride is homogeneously mixed with two-thirds of the wheat starch and two-thirds of the colloidal silicic acid with hydrolyzed starch, and the mixture passed through a sieve having a mesh of 0.5 mm. Gelatine is dissolved in ten times its weight of water, one-third of the wheat starch is suspended in double the quantity of water and pasted on a water-bath. The powder mixture is evenly moistened with the solution of binding agent and kneaded until a plastic mass is formed. The latter is passed through a sieve having a mesh of 3 mm., dried at a temperature not higher than 45° C. and then passed through a sieve having a mesh of 1.5 mm. To the resulting granulate there are added arrowroot, stearic acid, talc and one-third of the colloidal silicic acid with hydrolyzed starch in a finely screened form and, after further homogenization, compressed in the conventional manner into tablets weighing 300 mg. and having a diameter of 10 mm.

In an analogous manner tablets may be prepared containing 3-phenyl-4-n-propyl-sydnonimine hydrochloride,
N-caproyl-3-phenyl-sydnonimine hydrochloride,
N-propionyl-3,4-diphenyl-sydnonimine hydrochloride,
N-butyryl-3-phenyl-sydnonimine hydrochloride,
N-valeryl-3-phenyl-sydnonimine hydrochloride,
N-propionyl-3-phenyl-4-methyl-sydnonimine hydrochloride,
N-propionyl-3-phenyl-4-(para-chlorophenyl)-sydnonimine hydrochloride,
N-propionyl-3-phenyl-sydnonimine hydrochloride,
3-(meta-tolyl)-sydnonimine hydrochloride,
3-(ortho-tolyl)-sydnonimine hydrochloride or
N-acetyl 3-(3':4'-dimethylphenyl)-sydnonimine hydrochloride.

Example 25

22.1 grams of N-nitroso-para-chloranilino-acetonitrile (melting at 97–98° C.), obtained by nitrosation of para-chloranilino-acetonitrile, are dissolved in 350 cc. of methanolic hydrochloric acid. The solution is kept for ½ hour at room temperature, then evaporated to dryness under vacuum. The resulting colorless crystals are recrystallized from methanol, to yield 3-para-chlorophenyl-sydnonimine hydrochloride of the formula

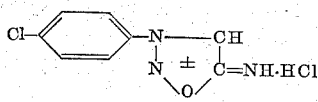

melting at 192° C. with decomposition.

Example 26

A solution of 10 grams of N-nitroso-para-anisidino-acetonitrile in 150 cc. of methanolic hydrochloric acid is kept for a short time at room temperature and then evaporated to dryness under vacuum. The crystalline residue is recrystallized from 120 cc. of absolute alcohol, to yield 3-(para-methoxyphenyl)-sydnonimine hydrochloride in the form of colorless crystals melting at 191–193° C. with decomposition, of the formula

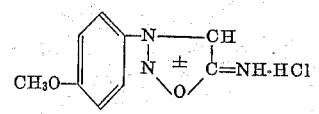

In an analogous manner N-nitroso-ortho-anisidino-acetonitrile yields 3-(ortho-methoxyphenyl)-sydnonimine hydrochloride melting at 192–193° C. with decomposition (from absolute alcohol), while N-nitroso-meta-anisidino-acetonitrile yields 3 - (meta-methoxyphenyl)-sydnonimine hydrochloride melting at 180–182° C. with decomposition.

The starting material can be prepared, for example, as follows:

A solution of 23.1 grams of sodium nitrite in 150 cc. of water is stirred dropwise, while cooling, in a solution of 55.5 grams of para-anisidino-acetonitrile in a mixture of 770 cc. of methanol, 385 cc. of N-hydrochloric acid and 385 cc. of water, and the whole is stirred on for 1 hour at 0° C. The precipitated crystals are then suctioned off, washed with water and recrystallized from 250 cc. of isopropanol, to yield N-nitroso-para-anisidino-acetonitrile in the form of yellow crystals melting at 62–63° C. In an analogous manner there are obtained from ortho-anisidino-acetonitrile:

The corresponding N-nitroso derivatives melting at 78–81° C. (from isopropanol); and From meta-anisidino-acetonitrile: the N-nitroso-meta-anisidino-acetonitrile melting at 48–50° C. (from isopropanol).

Example 27

A suspension of 20 grams of 3-(para-methoxyphenyl)-sydnonimine hydrochloride is heated in a mixture of 200 cc. of acetic anhydride and 100 cc. of pyridine for 3 hours on a steam bath and then allowed to crystallize at −10° C. The resulting crystals are suctioned off and recrystallized from 360 cc. of isopropanol, to yield N-acetyl - 3-(para-methoxyphenyl)-sydnonimine melting at 184–185° C. with decomposition of the formula

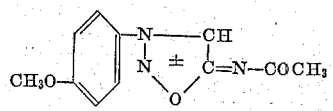

The corresponding hydrochloride, obtained by addition of methanolic hydrochloric acid and evaporation, melts at 197–198° C. with decomposition after recrystallization from absolute alcohol.

Example 28

A solution of 6 grams of 3-(ortho-methoxyphenyl)-sydnonimine hydrochloride in a mixture of 100 cc. of acetic anhydride and 50 cc. of pyridine is kept for 24 hours at room temperature, then evaporated to dryness under vacuum; the crystalline residue is recrystallized from 150 cc. of isopropanol and yields N-acetyl-3-(ortho-methoxyphenyl)-sydnonimine hydrochloride melting at 185–187° C. with decomposition of the formula

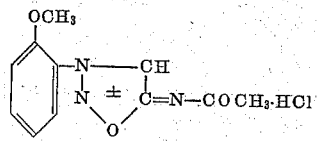

The corresponding free base is obtained by dissolving the hydrochloride in water and precipitation with aqueous sodium bicarbonate. After having been recrystallized from a small amount of isopropanol, the free base melts at 157–158° C. with decomposition.

In an analogous manner, 3-(meta-methoxyphenyl)-sydnonimine hydrochloride yields N-acetyl-3-(meta-methoxyphenyl)-sydnonimine hydrochloride melting at 185° C. with decomposition; the corresponding free base melts at 111 to 113° C.

Example 29

4.7 grams of N - nitroso-2-methoxy-5-chloroanilino-acetonitrile are dissolved in 50 cc. of saturated methanolic hydrochloric acid and evaporated to dryness. The oily precipitate becomes crystalline by being boiled with 100 cc. of absolute tetrahydrofuran and 3-(2'-methoxy-5'-chloro-phenyl)-sydnonimine hydrochloride of the formula

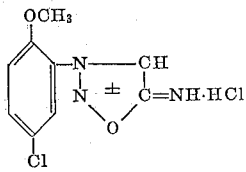

melting at 170-172° C. with decomposition is obtained.

The starting material is obtained, for example, as follows:

80 grams of 2-amino-4-chloro-anisol are added to a solution of 40 grams of aqueous formaldehyde (37–40%), 100 cc. of water and 52 grams of sodium bisulfite and the whole is stirred overnight at 60-70% C. The reaction mixture is then heated to 90° C., a solution of 34 grams of potassium cyanide in 100 cc. of water is added, the whole left for 20 minutes at that temperature and then cooled. The precipitated crystalline cake is taken up in 1.5 liters of ether.

The dried ether extract is evaporated to about 500 cc., 500 cc. of petroleum ether are added and the whole considerably cooled. The precipitated crystals are suction-filtered to yield 2-methoxy-5-chloro-anilino-acetonitrile melting at 74-76° C. 5 grams of the substance are dissolved in 100 cc. of methanol. 15 cc. of 2 N-hydrochloric acid are added, the reaction mixture is cooled to 0° C. and a solution of 2 grams of sodium nitrite in 10 cc. of water is added dropwise with stirring. The whole is then stirred for 4 hours at room temperature, 200 cc. of water are added and the mixture then cooled to 0° C. The resulting crystals are suction-filtered and recrystallized from isopropanol to yield N-nitroso-2-methoxy-5-chloro-anilino-acetonitrile melting at 87-88° C.

In an analogous manner to that described above there may be prepared the 3-(3',4',5'-trimethoxyphenyl)-sydnonimine hydrochloride.

Example 30

2.8 grams of 3-(2'-methoxy-5'-chlorophenyl)-sydnonimine hydrochloride are dissolved in a mixture of 30 cc. of pyridine and 70 cc. of acetic anhydride and the clear red solution is then allowed to stand overnight at room temperature. The reaction mixture is evaporated to dryness in vacuo and the crystalline residue recrystallized from isopropanol to yield N-acetyl-3-(2'-methoxy-5'-chlorophenyl)-sydnonimine hydrochloride of the formula

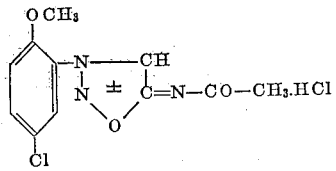

melting at 183-184° C. with decomposition.

The corresponding free base prepared in the ordinary manner melts at 150-153° C. with decomposition after recrystallization from isopropanol.

Example 31

16 grams of N-nitroso-para-hydroxyanilino-acetonitrile are dissolved in ten times the quantity of saturated methanolic hydrochloric acid and then evaporated to dryness. The brown crystalline residue is recrystallized several times from methanol and yields 3-(para-hydroxy-phenyl)-sydnonimine hydrochloride of the formula

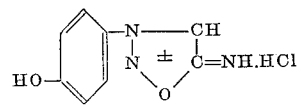

melting at 200° C. with decomposition.

The starting material may be obtained, for example, as follows:

55 grams of para-hydroxy-aniline are added to a solution of 15 grams of formaldehyde and 52 grams of sodium bisulfite in 120 cc. of water and the mixture is stirred overnight at room temperature. The solution is then heated to 90° C. and treated with a solution of 33 grams of potassium cyanide in 70 cc. of water and after 10 minutes cooled to 0° C. The precipitated solid material is suction-filtered, washed thoroughly with water and dried, extracted several times with 500 cc. of boiling ether each time and the extracts evaporated to dryness. The crystalline residue can be recrystallized from isopropanol to yield para-hydroxy-anilino-acetonitrile melting at 104–105° C. 14.8 grams of this compound are dissolved in a mixture of 60 cc. of methanol and 60 cc. of 2 N-hydrochloric acid. The solution is cooled to 0° C., and an aqueous solution of 7.5 grams of sodium nitrite is added dropwise with stirring at 0° C. After being allowed to stand for some time, the reaction mixture is extracted with ether. The dried extract is evaporated to dryness to yield N-nitroso-para-hydroxy-anilino-acetonitrile in the form of an oil which solidifies in crystalline form at 0° C.

Example 32

1 gram of 3-para-hydroxyphenyl-sydnonimine hydrochloride is dissolved in 25 cc. of water, cooled to 0° C. and a solution of 0.4 grams of sodium bicarbonate in 10 cc. of water is added. At 0° C. crystals slowly separate which, after being suction-filtered and dried, melt at 62–63° C. with decomposition; they are the hydrate of 3-(para-hydroxyphenyl)-sydnonimine which is present in the form of an amphoteric ion and whose formula can be described by the following mesomeric structures:

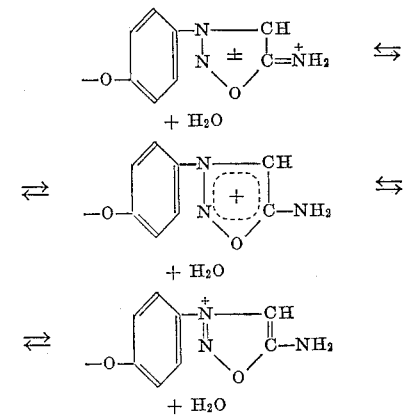

Example 33

5.3 grams of 3-(para-hydroxyphenyl)-sydnonimine hydrochloride are suspended in a mixture of 15 cc. of absolute pyridine and 50 cc. of acetic anhydride and stirred overnight at 50-60° C. After being cooled to −10° C., the resulting crystals are suction-filtered and recrystallized from alcohol to yield N-acetyl-3-(para-acetoxy-phenyl)-sydnonimine hydrochloride of the formula

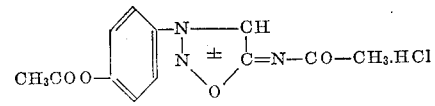

melting at 200° C. with decomposition.

Example 34

0.5 gram of N-acetyl-3-(para-acetoxy-phenyl)-sydnonimine hydrochloride is dissolved in water and a solution of sodium bicarbonate added. The resulting crystalline precipitate is suction-filtered and recrystallized from isopropanol to yield N-acetyl-3-(parahydroxyphenyl)-sydnonimine of the formula

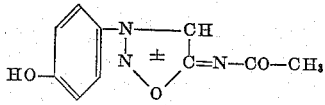

melting at 150–151° C. with decomposition.

Example 35

0.1 gram of N-nitroso-1:2:3:4-tetrahydro-quinaldinic acid nitrile is dissolved in 15 cc. of methanolic hydrochloric acid and evaporated to dryness after 15 minutes. The crystalline residue is recrystallized from absolute alcohol to yield 3′:4′-dihydroquinolino-[1′:2′-c]-sydnonimine hydrochloride of the formula

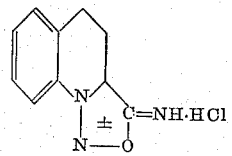

melting at 211–212° C. with decomposition.

The starting material may be obtained, for example, as follows:

1 gram of 1:2:3:4-tetrahydro-quinaldinic acid amide is dissolved in 10 cc. of absolute pyridine, and 1 cc. of phosphorus oxychloride is added. After being allowed to stand overnight, the reaction mixture is evaporated to dryness in vacuo, the residue stirred with a mixture of dilute aqueous sodium hydroxide solution and chloroform, and the chloroform layer dried and evaporated. The residue is sublimed at 100° C. in a high vacuum for 20 hours. The oily sublimate is dissolved in 10 cc. of methanol, 1 cc. of 2 N-hydrochloric acid is added, and at 0° C. sodium nitrite solution is added dropwise. After the addition of 10 cc. of water, faintly yellow crystals are obtained which are suction-filtered and recrystallized from isopropanol, to yield pure N-nitroso-1:2:3:4-tetrahydro-quinaldinic acid nitrile melting at 67–68° C.

Example 36

2 cc. of acetic anhydride and 10 drops of absolute pyridine are added to 30 mg. of 3′:4′-di-hydroquinolino-[1′:2′-c]-sydnonimine hydrochloride; the whole is heated for 2½ hours at 60–70° C. and then allowed to crystallize out at 0° C. The crystals are suction-filtered, washed with ether and recrystallized from isopropanol to yield N-acetyl-3′:4′-dihydroquinolino-[1′:2′-c]-sydnonimine hydrochloride of the formula

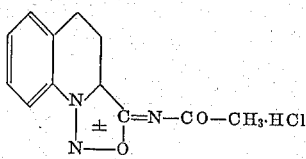

which decomposes slowly above 160° C. The corresponding free base prepared in the ordinary manner melts at 166–168° C. after recrystallization from a mixture of ether and petroleum ether.

Example 37

11.4 grams of 3-(para-methoxyphenyl)-sydnonimine hydrochloride are dissolved in 100 cc. of icecold water, 5 grams of sodium bicarbonate are added, and after 10 minutes 5 grams of n-butyl isocyanate are added dropwise with stirring and cooling. When the addition is complete, stirring is continued for half an hour at 0° C., and then the same quantity of n-butyl isocyanate is again added dropwise. The reaction mixture is then stirred for 2 hours at 0° C. and overnight at room temperature. The precipitated crystals are suction-filtered, washed with water and recrystallized from alcohol to yield N-(n-butyl-carbamyl)-3-(para-methoxypehnyl)-sydonimine of the formula

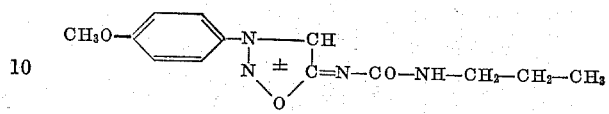

in the form of yellow crystals melting at 120–122° C. On dissolving the above product in methanolic hydrochloric acid, evaporating and recrystallizing the residue from isopropanol, a hydrochloride melting at 174–176° C. with decomposition is obtained.

Example 38

4.4 grams of sodium bicarbonate are added to an ice-cold solution of 9.7 grams of 3-(meta-tolyl)-sydnonimine hydrochloride, and, after 10 minutes, 4.4 grams of n-butyl isocyanate are slowly added dropwise at 0° C. with stirring. The whole is then stirred for 30 minutes at 0° C. and another 4.4 grams of n-butyl-isocyanate are added dropwise. The reaction mixture is allowed to stand overnight at 25° C., the precipitated crystals are suction-filtered, washed with water and recrystallized from alcohol to yield N-(n-butylcarbamoyl)-3-(meta-tolyl)-sydnonimine of the formula

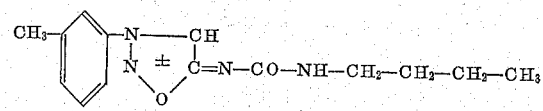

melting at 85–89° C. with decomposition. The corresponding hydrochloride prepared as described in Example 37 melts at 151–152° C. after recrystallization for isopropanol.

Example 39

10 grams of sodium bicarbonate are added to an ice cold solution of 20 grams of 3-phenylsydnonimine hydrochloride in 200 cc. of water, and while thoroughly cooling (at 0° C.), 15 grams of n-butyl-isocyanate are slowly stirred in. The mixture is stirred for 30 minutes at 0°, and another 15 grams of n-butyl-isocyanate are added dropwise, whereupon the mixture is stirred for 4 hours at 0° C. and then overnight at room temperature. The separated yellowish crystals are suctioned off and recrystallized from 120 cc. of methanol, to yield N-n-butylcarbamyl-3-phenyl-sydnonimine in the form of the hemi-hydrate of the formula

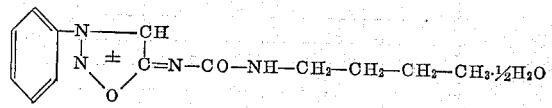

melting at 92–93° C.

The corresponding hydrochloride is obtained in the conventional manner in the form of yellow crystals which melt at 122–125° C. with decomposition after recrystallization from isopropanol.

In an analogous manner there may be obtained N-n-butylcarbamyl-3:4-diphenyl-sydnonimine melting at 143–144° C. (from isopropanol); its hydrochloride melts at 184–185° C. with decomposition (from absolute alcohol).

Example 40

A solution of 1.7 grams of bromine in 17 cc. of glacial acetic acid is added dropwise at room temperature to the stirred solution of 2.6 grams of N-(n-butyl-carbamyl)-3-phenyl-sydnonimine in 25 cc. of glacial acetic acid. The reaction mixture is allowed to stand for 20 hours and a few crystals are then suction-filtered. The filtrate is evaporated to dryness in vacuo and the yellow crystalline residue is recrystallized from methanol to yield N-(n-butylcarbamyl) - 3 - phenyl-4-bromo-sydnonimine hydrobromide as colorless crystals of the formula

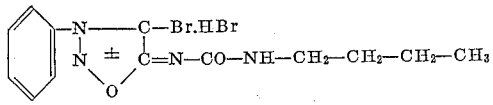

melting at 173–174° C. with decomposition.

*Example 41*

Ampoules containing 3-(para-chloro)-phenyl-sydnonimine hydrochloride as active principle can be made in conventional manner from the following ingredients:

3 - (para - chloro)-phenyl-sydnonimine hydrochloride, mg. _____ 40
Sodium chloride to form an isotonic solution.
Water, cc. _____ 5

*Example 42*

Capsules containing 3-(para-methoxy)-phenyl-sydnonimine as active principle are obtained by charging gelatine capsules in known manner with a mixture of the following composition:

|  | Mg. |
|---|---|
| 3-(para-methoxy)-phenyl-sydnonimine | 100 |
| Magnesium stearate | 5 |
| Talc | 20 |
| Per capsule | 125 |

In an analogous manner capsules can be manufactured that contain as active principle 3-(ortho-methoxyphenyl)-sydnonimine hydrochloride,
3-(meta-methoxyphenyl)-sydnonimine hydrochloride,
3-(2'-methoxy-5'-chlorophenyl)-sydnonimine hydrochloride,
3-(3',4',5'-trimethoxyphenyl)-sydnonimine hydrochloride,
3-(para-hydroxyphenyl)-sydnonimine hydrochloride,
N-acetyl-3-(para-acetoxyphenyl)-sydnonimine hydrochloride,
3':4'-dihydroquinolino-[1':2'-c]-sydnonimine hydrochloride or
N-(n-butylcarbamoyl)-3-phenyl-4-bromo-sydnonimine hydrobromide.

*Example 43*

A table containing N-acetyl-3-(para-methoxyphenyl)-sydnonimine hydrochloride as active principle may have, for example, the following ingredients:

|  | Mg. |
|---|---|
| N-acetyl-3-(para-methoxyphenyl)-sydnonimine hydrochloride | 100.0 |
| Wheat starch | 136.0 |
| Colloidal silicic acid with hydrolyzed starch | 15.0 |
| Gelatine | 3.0 |
| Arrowroot | 25.0 |
| Stearic acid | 9.0 |
| Talc | 12.0 |
|  | 300.0 |

The tablets may be prepared in the following manner: N-acetyl-3-(para-methoxyphenyl)-sydnonimine hydrochloride is mixed homogeneously with two-thirds of the wheat starch and two-thirds of the colloidal silicic acid with hydrolyzed starch, and the mixture passed through a sieve having a mesh of 0.5 mm. Gelatine is dissolved in ten times its weight of water, one-third of the wheat starch is suspended in double the quantity of water and pasted on a water bath. The powder mixture is evenly moistened with the solution of binding agent and kneaded until a plastic mass is formed. The latter is passed through a sieve having a mesh of 3 mm., dried at a temperature not higher than 45° C., and then passed through a sieve having a mesh of 1.5 mm. To the resulting granulate there are added arrowroot, stearic acid, talc and one-third of the colloidal silicic acid with hydrolyzed starch in a finely sieved form, and, after further homogenisation, the mass is compressed in the conventional manner into tablets weighing 300 mg. and having a diameter of 10 mm.

In an analogous manner tablets may be prepared containing as active principle

N-acetyl-3-(ortho-methoxyphenyl)-sydnonimine hydrochloride,
N-acetyl-3-(para-methoxyphenyl)sydnonimine hydrochloride,
N-acetyl-3-(2'-methoxy-5'-chlorophenyl)-sydnonimine hydrochloride,
N-acetyl-3-(para-hydroxyphenyl)-sydnonimine hydrochloride or
N-acetyl-3',4'-dihydroquinolino[1',2'-c]-sydnonimine hydrochloride.

What is claimed is:
1. A pharmaceutical composition useful as an antirheumatic which comprises
   (a) an effective amount of a member selected from the group consisting of sydnonimines of the formula

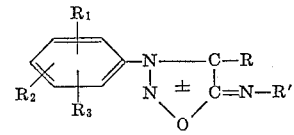

in which $R_1$, $R_2$ and $R_3$ each stands for a member selected from the group consisting of hydrogen, lower alkyl, hydroxyl, lower alkoxy, lower alkanoyloxy, benzoyloxy, halogen and trifluoromethyl, and, when taken together, two of them form methylenedioxy, R stands for a member selected from the group consisting of hydrogen, lower alkyl, halogen, the group of the formula

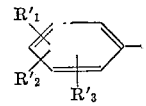

in which $R'_1$, $R'_2$ and $R'_3$ each stands for a member selected from the group consisting of hydrogen, lower alkyl, hydroxyl, lower alkoxy, halogen and trifluoromethyl, and, when taken together, two of them form methylenedioxy, and lower alkylene attached to the phenyl radical in 4-position, and R' stands for a member selected from the group consisting of hydrogen, alkanoyl containing up to 20 carbon atoms, benzoyl and lower-alkylcarbamyl, and its pysiologically tolerable acid addition salts, and
   (b) an inert pharmaceutical carrier.

2. A pharmaceutical composition useful as an antirheumatic which comprises
   (a) an effective amount of a member selected from the group consisting of sydnonimines of the formula

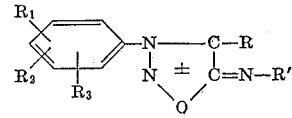

in which $R_1$, $R_2$ and $R_3$ each stands for a member selected from the group consisting of hydrogen and lower alkyl, R stands for a member selected from the group consisting of hydrogen, lower alkyl, halogen, the group of the formula

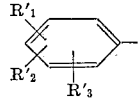

in which $R'_1$, $R'_2$ and $R'_3$ each stands for a member selected from the group consisting of hydrogen, lower alkyl, hydroxyl, lower alkoxy, halogen and trifluoromethyl, and, when taken together, two of them form methylenedioxy, and lower alkylene attached to the phenyl radical in 4-position, and R' stands for a member selected from the group consisting of hydrogen, alkanoyl containing up to 20 carbon atoms and benzoyl, and its therapeutically useful acid addition salts as active ingredient and (b) an inert pharmaceutical carrier.

3. A pharmaceutical composition useful as an antirheumatic which comprises (a) an effective amount of a sydnonimine of the formula

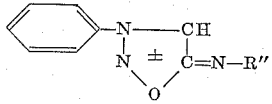

in which R" stands for lower alkanoyl as active ingredient and (b) an inert pharmaceutical carrier.

4. A pharmaceutical composition useful as an antirheumatic which comprises (a) an effective amount of a therapeutically useful acid addition salt of a sydnonimine of the formula

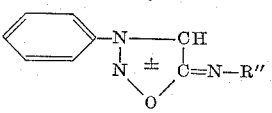

in which R" stands for lower alkanoyl as active ingredient and (b) an inert pharmaceutical carrier.

5. A pharmaceutical composition useful as an antirheumatic which comprises (a) an effective amount of a therapeutically useful acid addition salt of a sydnonimine of the formula

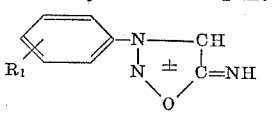

in which $R_1$ stands for lower alkyl as active ingredient and (b) an inert pharmaceutical carrier.

6. A pharmaceutical composition useful as an antirheumatic which comprises (a) an effective amount of a therapeutically useful acid addition salt of a sydnonimine of the formula

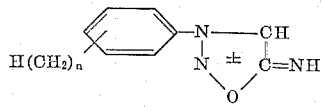

in which $n$ stands for an integer from 0 to 1 as active ingredient and (b) an inert pharmaceutical carrier.

7. A pharmaceutical preparation useful as an antirheumatic which comprises an effective amount of a therapeutically acceptable acid addition salt of N-acetyl-3-phenyl-sydnonimine and an inert pharmaceutical carrier.

8. A pharmaceutical preparation useful as an antirheumatic which comprises an effective amount of a therapeutically acceptable acid addition salt of N-propionyl-3-phenyl-sydnonimine and an inert pharmaceutical carrier.

9. A pharmaceutical preparation useful as an antirheumatic which comprises an effective amount of a therapeutically acceptable acid addition salt of 3-phenyl-4-n-propyl-sydnonimine and an inert pharmaceutical carrier.

References Cited

Kato, Chemical Abstracts, vol. 54, col. 511 (g), 1960.

Vasil'eva, Chemical Abstracts, vol. 54, col. 8793 (f), 1960.

ALBERT T. MEYERS, *Primary Examiner.*

SAM ROSEN, *Examiner.*

L. RANDALL, *Assistant Examiner.*